J. A. DE CEW.
PROCESS FOR MAKING RESIN SIZE.
APPLICATION FILED FEB. 21, 1914. RENEWED JUNE 20, 1918.
1,292,721.
Patented Jan. 28, 1919.
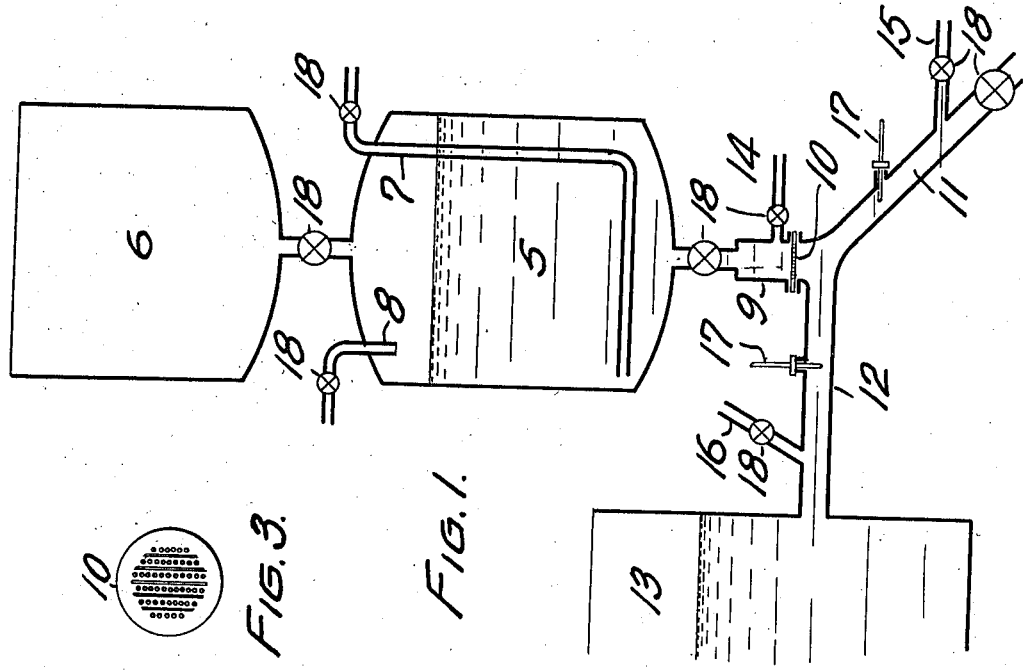
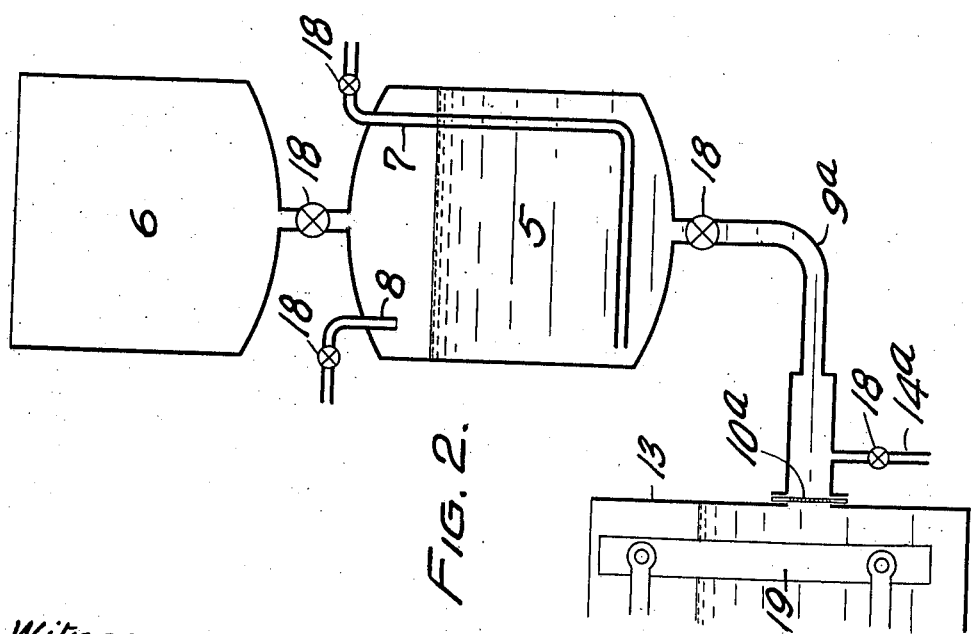
Witnesses
Inventor
J. A. DeCew
By
His Attorney

UNITED STATES PATENT OFFICE.

JUDSON A. DE CEW, OF MONTREAL, QUEBEC, CANADA.

PROCESS FOR MAKING RESIN SIZE.

1,292,721.  Specification of Letters Patent.  Patented Jan. 28, 1919.

Application filed February 21, 1914, Serial No. 820,373. Renewed June 20, 1918. Serial No. 241,094.

*To all whom it may concern:*

Be it known that I, JUDSON A. DE CEW, a subject of the King of Great Britain, and resident of the city of Montreal, in the Province of Quebec and Dominion of Canada, have invented certain new and useful Improvements in Processes for Making Resin Size, of which the following is a full, clear, and exact description.

This invention relates to improvements in method of and apparatus for preparing dilute solutions of resin soap containing unsaponified resin in solution, and the object of the invention is to provide means for making very weak solutions of resin soap in which the unsaponified resin remains in solution.

In the use of resin soap for sizing paper, in which the dissolved resin is coagulated by means of sulfate of alumina, the chemical reactions always take place in dilute solution. If the resin soap is not diluted before it is brought into contact with the paper stock, the dilution then takes place so that the final reaction is always between weak solutions.

In order to get a complete reaction in the coagulated mass which is formed when sulfate of alumina comes in contact with the resin soap, it is desirable that the amount of soda present in the soap should be as small as possible. If, however, a resin soap is made which contains less soda than required to completely saponify the resin, there will remain a portion of the resin unsaponified in solution in the soap, the latter acting as a solvent.

We may, therefore, have a clear solution of resin soap in which is dissolved practically an equal weight of unsaponified resin. If this solution is clear and transparent when in a more concentrated condition, containing for example 40% of water, we find that it will become less transparent as we dissolve the soap until the dissolved but unsaponified resin separates entirely from the soap solution. We, therefore, find in ordinary practice that whereas a resin soap carrying 40% or 50% water is able to completely dissolve its own weight of resin, if this solution is diluted by ordinary methods so that it contains only 10% solid matter to 90% of water, it would only be able to hold in clear solution about one-half as much unsaponified resin, and if diluted to a 2% solution, the amount of unsaponified resin which can remain in perfect solution would not be over 10% or 15%. It is therefore desirable to devise some method by which a resin soap can be diluted to a perfect solution and still contain in solution the unsaponified resin originally dissolved.

I have discovered that the cause of the precipitation or rejection from solution of the dissolved resin is due to the fact that the rate of solution is too slow. As an illustration, it may be stated that if a hard piece of resin soap in which resin is dissolved is placed in cold water, the saponified resin only enters into solution and the unsaponified resin remains, forming a scum over the piece of soap. I have also discovered that this unsaponified resin may also be dissolved by forming a perfect solution if the opportunity for immediate solution of the soap is given. In order to obtain the desired results, the solution must be instantaneous and must also take place at a proper temperature. I accomplish this result and obtain instantaneous solution by forcing the size into intimate contact with hot water by means of pressure. To get intimate contact, the hot size is broken up to present the largest possible surface, so that there can be immediate surface contact and consequently solution. This is done by forcing the hot size through suitable orifices in the form of films or capillary jets into the hot water.

In order to more perfectly explain the method, I have illustrated diagrammatically in the accompanying drawings an apparatus by means of which it may be carried out, and of which:—

Figure 1 is the preferred form.
Fig. 2 is an alternative form.
Fig. 3 is an enlarged plan view of the screen.

Referring more particularly to Fig. 1, 5 designates a closed vessel for the reception of the concentrated resin size, which is preferably admitted from a measuring tank 6 located above. The size is then heated to a suitable temperature by steam or other agent admitted through pipe 7, and fluid pressure is admitted through pipe 8 to hold the soap under pressure. The heated soap is then discharged at a suitable rate through a pipe 9, in which is located a screen 10 having slits or other suitably shaped apertures therein arranged to break the soap up into very thin films or jets, so that the soap will have the largest possible amount of surface in proportion to the volume. These jets of soap are projected into a hot water pipe 11 meeting the pipe 9 at an angle greater than 90%, so that the directions of the soap and hot water are more or less opposite, and a very thorough mingling of the two results, and the soap passes instantly into solution in the water. The solution then flows through the pipe 12 into the solution tank 13. This pipe 12 is arranged preferably at right angles to the pipe 9 and at an angle greater than 90% to the pipe 11, as clearly shown in Fig. 1. Leading into the pipe 9 is a pipe 14 through which water, for cleaning the screen, may be admitted. The hot water pipe 11 and solution pipe 12 are provided with cold water inlet pipes 15 and 16 respectively and with thermometers 17, so that the temperature of the water may be very nicely regulated. The flow through all pipes is controlled by means of valves, designated 18.

In the form shown in Fig. 2, the soap measuring and pressure tanks are substantially as already described. The soap flows out of the pressure tank through the pipe 9ª, which opens directly into the solution tank 13, and is provided as close as possible to the tank with a foraminous plate of screen 10ª. A clean out pipe 14ª corresponding to the pipe 14 is provided in this form. It may be found necessary to provide in the solution tank an agitator, as indicated at 19, in order to keep the solution in the tank in motion and remove the dissolved size from the sphere of action, and bring pure water or weak solution into contact with the inflowing streams of size.

The form shown in Fig. 1 obviously has many advantages over the form shown in Fig. 2. The size and water flowing in approximately opposite directions and being compelled to ultimately take the same direction, produce thorough and instant mingling of the two, so that the size passes into solution. The flow of water and size may also be regulated, so that at all times a given volume of size is brought into contact with the proper amount of fresh water to make the desired solution, so that solution continues at the same rate from start to finish.

In the form shown in Fig. 2 where the water is placed in the tank 13 and the size forced in, the action becomes gradually slower and therefore more imperfect, owing to the fact that as the water takes up the size, a given volume of the solution loses dissolving power at approximately the same rate that it takes up the soap. This is compensated for by regulating the speed of the agitator. After the solution is effected, the water may be further cooled in order to retain stability in the solution, as by admission of cold water through the pipe 16 or directly into the solution tank. The instantaneous mixing or dissolving of the size in water enables a water diluted size to be produced without precipitation of the unsaponified resin, so that a clear solution containing as low as 2% of solid matter is produced.

By the application of fluid pressure introduced through pipe 8 the entire batch of size in closed vessel 5 is subjected to a uniform pressure. That is, by constantly introducing more fluid through pipe 8 simultaneously with the outflow of size from the vessel 5 it will be seen that the pressure is an unvarying one. Thus the last drop of a particular batch of size to leave the vessel 5 is subjected to exactly the same pressure as any preceding portion thereof. In this way a much desired uniformity in the finished product is obtained.

Having thus described my invention, what I claim is:—

1. A method of producing dilute solutions of resin soap which consists in heating the resin soap, forcing it through sub-divided apertures, and then forcing hot water against the sub-divided apertures in a direction substantially opposite to the initial flow of the resin soap, substantially as described.

2. A method of producing dilute solutions of resin soap, which consists in heating the resin soap in a closed tank, and by means of pressure applied to the interior of the tank, forcing it through an apertured screen, and then forcing hot water against the resin soap as it issues from the screen in an opposing angular direction.

In witness whereof, I have hereunto set my hand in the presence of two witnesses.

JUDSON A. DE CEW.

Witnesses:
S. R. W. ALLEN,
J. M. MORELAND.